July 28, 1964 G. H. GREEN 3,142,351
STAIR CLIMBING WHEELCHAIR
Filed Jan. 19, 1962 10 Sheets-Sheet 3

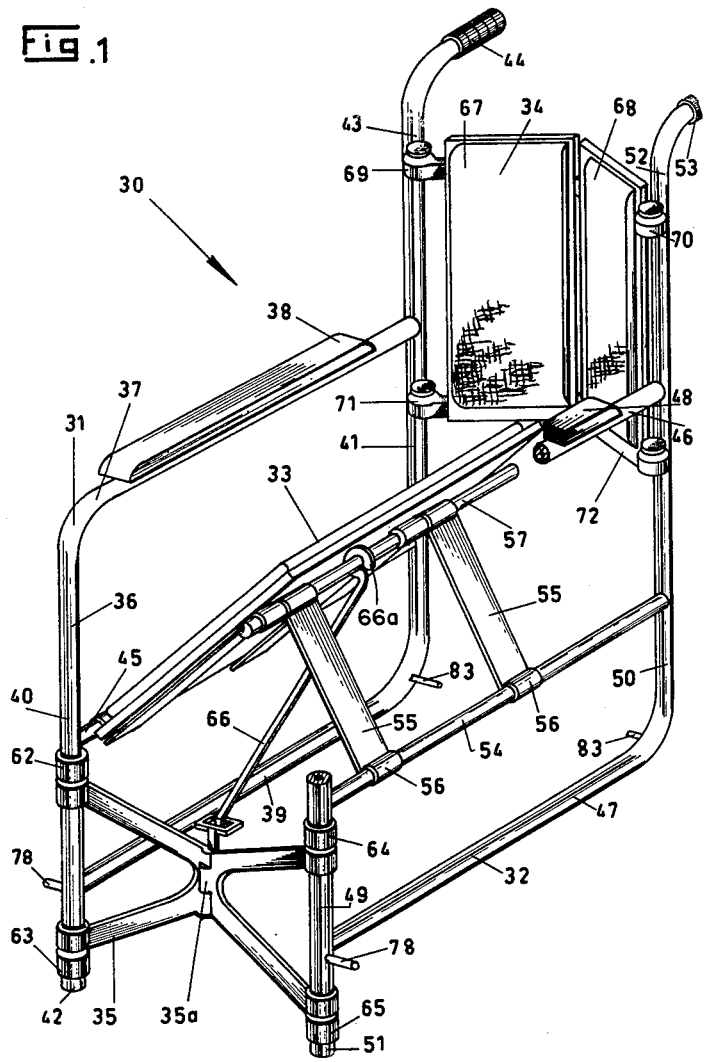

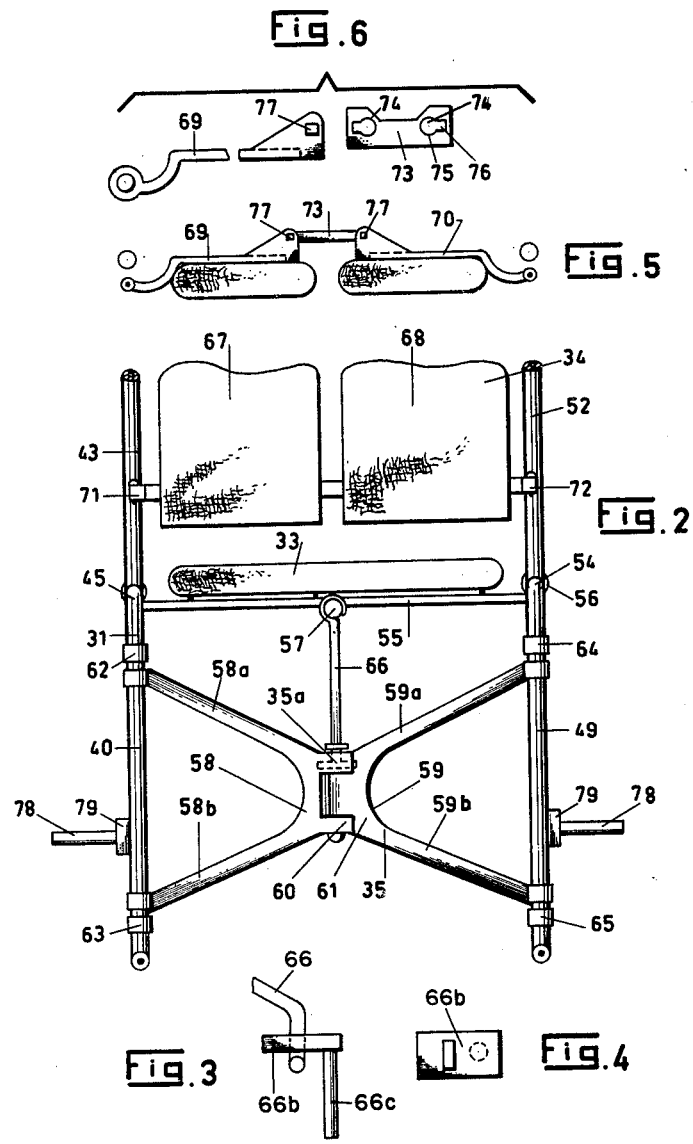

INVENTOR.
Gourley H Green

July 28, 1964  G. H. GREEN  3,142,351
STAIR CLIMBING WHEELCHAIR

Filed Jan. 19, 1962  10 Sheets-Sheet 4

INVENTOR.

July 28, 1964
G. H. GREEN
3,142,351
STAIR CLIMBING WHEELCHAIR
Filed Jan. 19, 1962
10 Sheets-Sheet 5
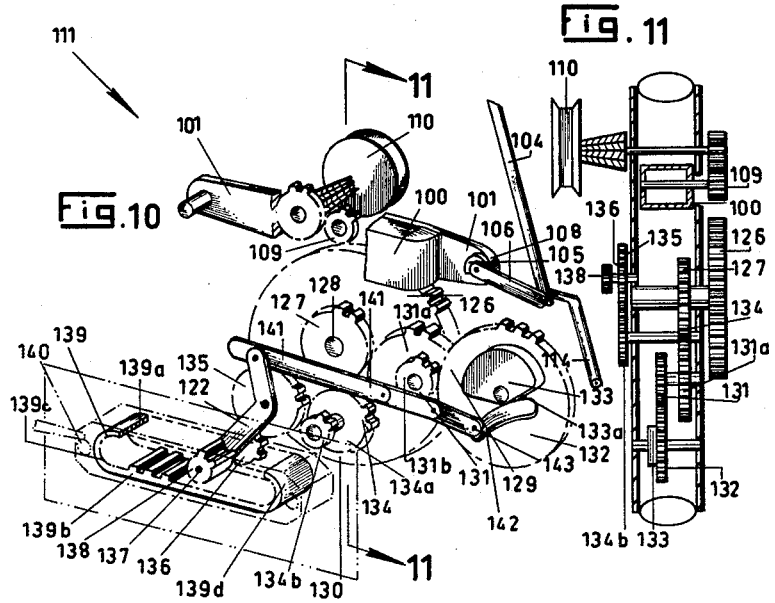
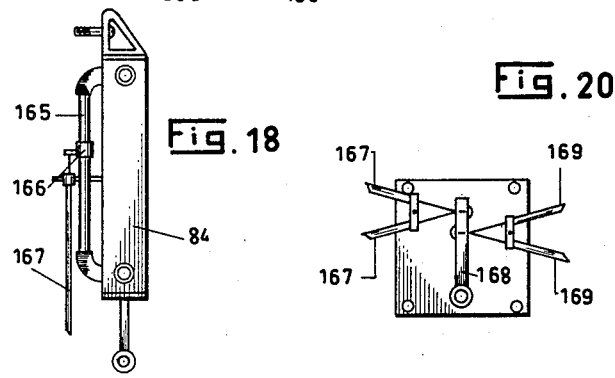
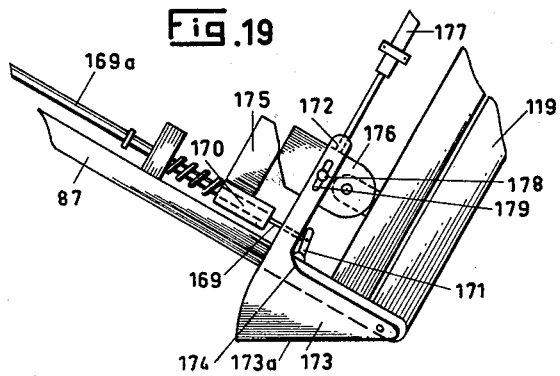
INVENTOR.
Gourley H. Green

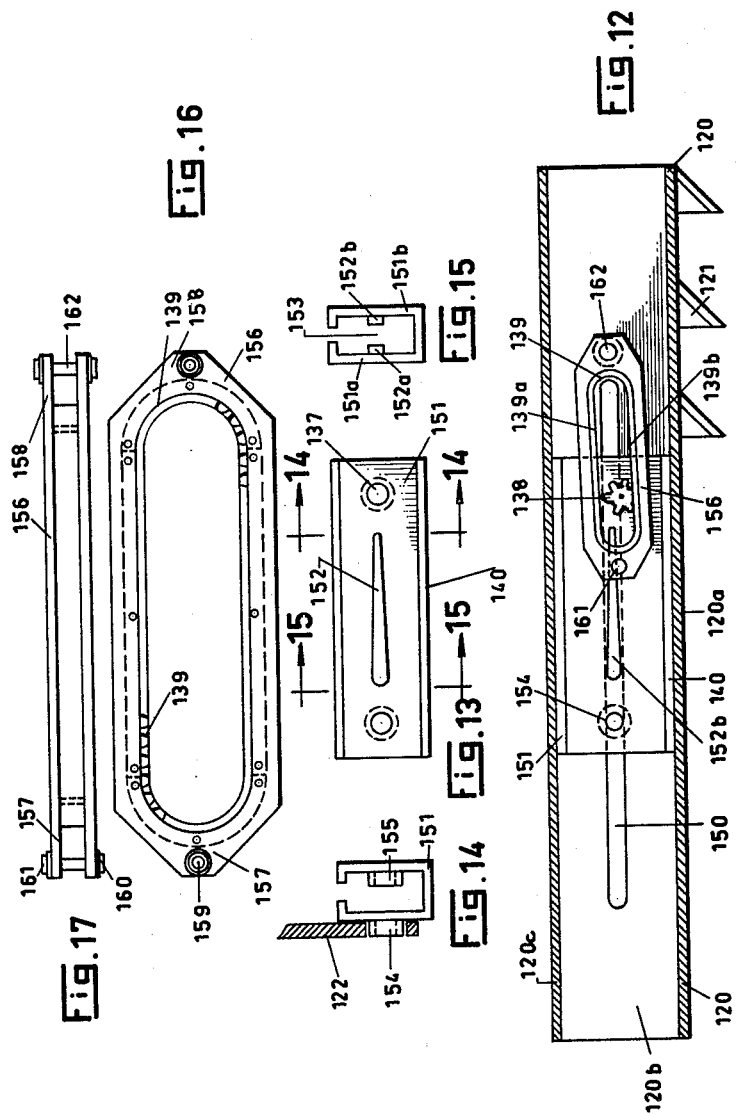

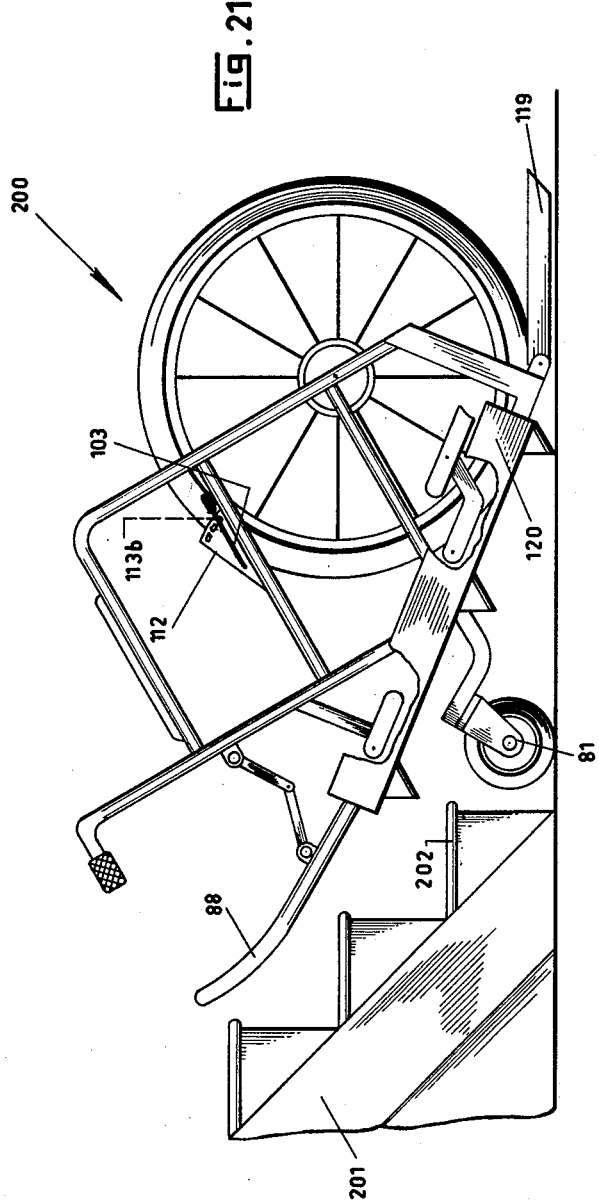

July 28, 1964 G. H. GREEN 3,142,351
STAIR CLIMBING WHEELCHAIR
Filed Jan. 19, 1962 10 Sheets-Sheet 8
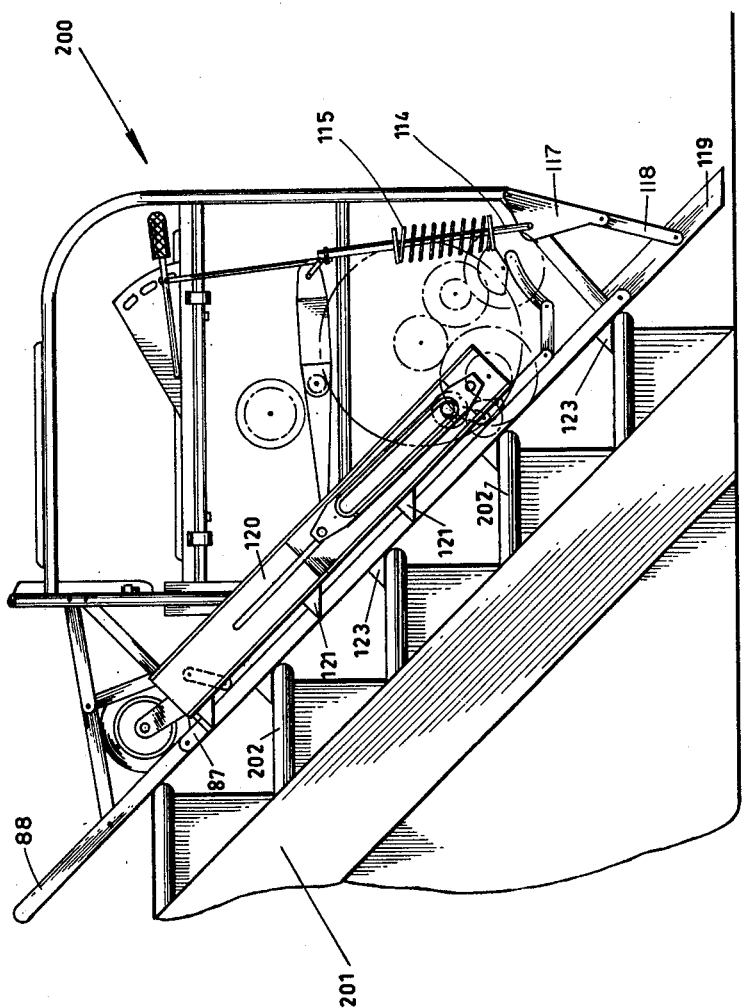
INVENTOR.
Gourley H Green July 28, 1964  G. H. GREEN  3,142,351
STAIR CLIMBING WHEELCHAIR
Filed Jan. 19, 1962  10 Sheets-Sheet 9

INVENTOR.
Sonley H Green

July 28, 1964 G. H. GREEN 3,142,351
STAIR CLIMBING WHEELCHAIR
Filed Jan. 19, 1962 10 Sheets-Sheet 10

INVENTOR.
Gousley H Green

United States Patent Office 3,142,351
Patented July 28, 1964

3,142,351
STAIR CLIMBING WHEELCHAIR
Gourley H. Green, Scarboro, Ontario, Canada (% Canadian Research, 1434 Queen St. W., Toronto 3, Ontario, Canada)
Filed Jan. 19, 1962, Ser. No. 167,384
12 Claims. (Cl. 180—8)

This invention relates to improvements in wheelchairs and more particularly to improvements in wheelchairs adapted to climb and descend stairs.

Present methods of moving wheelchairs between stories of a building include a permanent tracked structure fitted over a stairway, utilized in combination with a motor driven platform, the wheelchair being moved onto the platform which is then selected either to climb or descend as required. Another method includes the use of elevators and, of course, the occupant and chair may be carried manually. A common disadvantage of the track and elevator methods is that, being permanent structures, their use is limited to the buildings, in which they are fitted. Furthermore, they are expensive installations and therefore not readily available to many users of wheelchairs. The manual method requires at least one experienced attendant, and these people are not always available, especially in a private home for instance.

It is an object of the present invention to provide a stair climbing wheelchair, hereinafter known as a wheelchair, which will enable a user to ascend or descend any flight of stairs independently while remaining seated therein.

It is a further object of the invention to provide a wheelchair which is relatively inexpensive, being entirely self-contained and operable independently of external aids.

It is yet another object of the invention to provide a wheelchair which will have substantially foolproof safety devices incorporated therein to prevent dangers due to negligence, inexperience or the like while being utilized to climb or descend stairs.

It is still another object of this invention to provide a wheelchair which is foldable for transportation and storage.

It is a further object of the present invention to provide a wheelchair having a battery operated motor, the batteries thereof being non-spillable.

It is another object of this invention to provide a wheelchair which may be used as a normal wheelchair when not required for stair climbing.

It is another object of this invention to provide a wheelchair which may be manually or motor driven in the normal manner when not being utilized in stair climbing.

It is still another object of this invention to provide a wheelchair which may be selected to a reclining position if so desired.

A further object of the present invention is to provide a wheelchair which, although foldable, will provide a rigid seat structure which may be suitably cushioned.

These and other objects and features of this invention will become apparent when taken in conjunction with the accompanying drawings in which:

FIG. 1 is a perspective view of the framework of a wheelchair embodying the present invention, showing particularly the folding action of the chair.

FIG. 2 is a combined front elevation of the back rest portion of the framework as illustrated in FIG. 1 and a plan view of the folding X-brace members of the seat.

FIG. 3 is a side elevation of a swivel pin utilized in joining of the folding X-brace members of the seat as shown in FIG. 2.

FIG. 4 is a plan view of the swivel pin as shown in FIG. 3.

FIG. 5 is a plan view of the back rest portion of the framework illustrated in FIG. 1, shown in the open and locked position.

FIG. 6 is an enlarged plan view of part of the locking mechanism illustrated in FIG. 5.

FIG. 10 is a fractional perspective view of the gear train utilized in the stair climbing mechanism illustrated in FIG. 8.

FIG. 11 is a sectional view of the gear train illustrated in FIG. 10 taken on the line 11—11.

FIG. 12 is a side elevation of the lift mechanism incorporated in the stair climbing mechanism shown in FIG. 8.

FIG. 13 is a side elevation of the internal gear casing embodied in the lift mechanism illustrated in FIG. 12.

FIG. 14 is a sectional end elevation of the internal gear casing illustrated in FIG. 13 taken on the line 14—14, showing shaft support bosses.

FIG. 15 is a sectional end elevation of the internal gear casing illustrated in FIG. 13, taken on the line 15—15, showing the location of the guide wedges for the gear reciprocating rack drive.

FIG. 16 is a side elevation of the oval gear rack embodied in the lift mechanism shown in FIG. 12.

FIG. 17 is a plan view of the gear rack illustrated in FIG. 16.

FIG. 18 is a side elevation of one hydraulic cylinder utilized in the retraction gear showing particularly a safety device adapted to prevent inadvertent operation of the climbing device.

FIG. 19 is a fractional side elevation of a safety device adapted to arrest the motion of a chair upon said chair inadvertently dropping over a curb or the like.

FIG. 20 is a plan view of interconnecting mechanism between the safety devices illustrated in FIGS. 18 and 19.

FIG. 21 is a side elevation of a chair embodying the present invention shown approaching a stairway in preparation to climbing same.

FIG. 22 is a fractional side elevation of the chair shown in FIG. 21 showing particularly the stair climbing mechanism in operation and the position of the safety extensions during ascent or descent.

Figure 7:
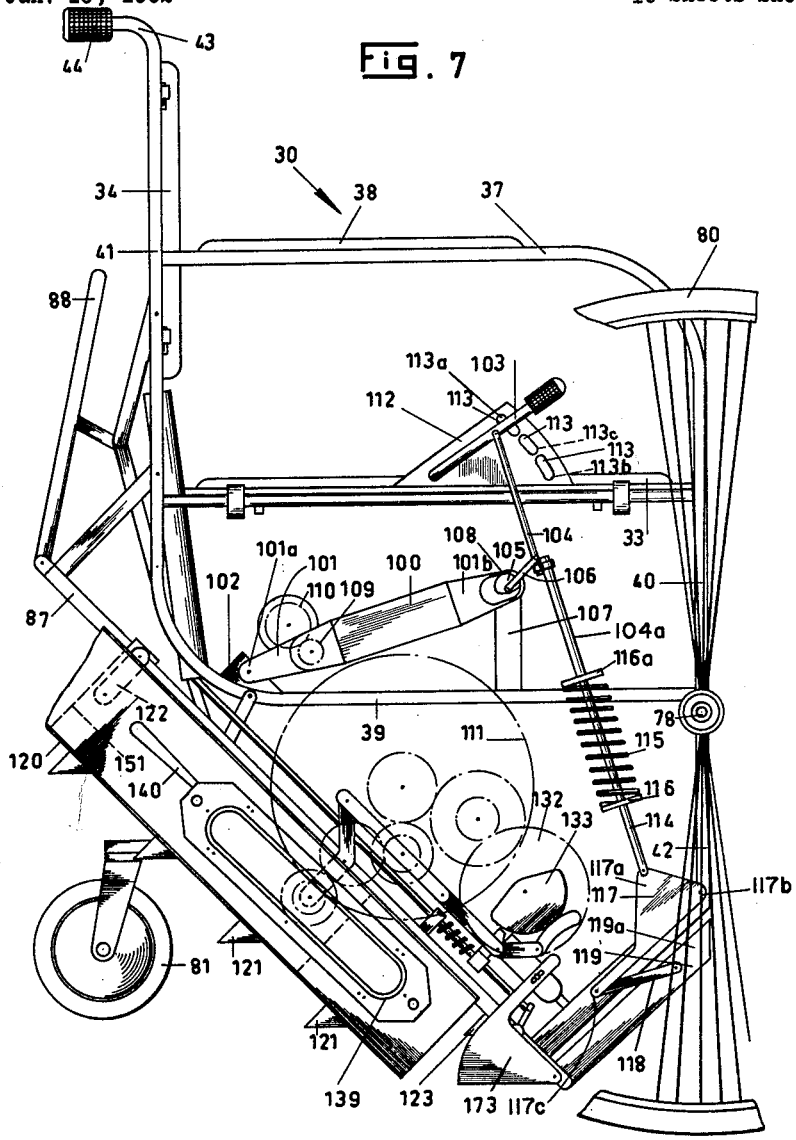
FIG. 7 is a side elevation of the framework illustrated in FIG. 1 after addition of the stair climbing mechanism.

Referring to FIG. 1, a framework 30 of a wheelchair embodying the present invention includes two side frames 31 and 32 held in parallel, spaced apart relationship by a seat member 33, a back rest assembly 34 and a front bracing assembly 35.

Side frame 31 comprises a rectangular framework 36 of tubular steel or the like, having an upper horizontal bar 37, adapted to support an arm rest 38, a lower horizontal bar 39 and front and rear vertical bars 40 and 41 respectively. A lower portion 42 of front vertical bar 40 extends downwardly below lower horizontal bar 39, and an upper portion 43 of rear vertical bar 41 extends upwardly above upper horizontal bar 37 to terminate in a hand grip 44. An intermediate horizontal bar 45 extends between vertical bars 40 and 41 in the lower half of framework 36.

Side frame 32 is substantially identical to side frame 31 but is oppositely handed thereto, having upper and lower horizontal bars 46 and 47 respectively, upper bar 46 supporting an arm rest 48; front and rear vertical bars 49 and 50 respectively; a lower portion 51 of front vertical bar 49; and an upwardly extending portion 52 of rear bar 50 terminating in a hand grip 53. An intermediate horizontal bar 54 is oppositely located to intermediate bar 45 of side frame 31 in the lower half of side frame 32.

Referring also to FIG. 2, seat member 33 is hingedly attached to intermediate bar 45 of side frame 31. A plurality of spaced apart support plates 55 are hingedly attached to intermediate bar 54 of side frame 32 at their outer ends 56 and hingedly attached to a longitudinal rod 57 running substantially centrally under seat 33. In this manner, upon seat 33 being caused to move arcuately upwardly about intermediate bar 45, hinge plates 55 also move arcuately upwardly about intermediate bar 54, side frames 31 and 32 are moved toward each other. Thus seat 33 assumes an almost vertical position upon side frames 31 and 32 being moved into close proximity with each other. Alternatively, upon side frames 31 and 32 being moved away from each other, seat 33 assumes a horizontal position and, due to the location of rod 57, is unable to move downwardly below the horizontal due to its mechanical locking on plates 55.

Front cross bracing assembly 35 includes two V-shaped struts 58 and 59 hingedly joined at their apexes 60 and 61 respectively. The legs 58a and 58b of strut 58 are suitably attached to front vertical bar 40 to permit strut 58 to pivot thereabout, in this particular case, the ends of legs 58a and 58b are wrapped around bar 40 in close but free turning contact and are restricted in axial movement upon bar 40 by an upper stop member 62 and a lower stop member 63. Legs 59a and 59b of strut 59 are similarly attached to vertical bar 49 and upper and lower stop members 64 and 65 respectively similarly prevent axial travel of strut 59 relative to bar 49.

A link rod 66 interconnects the hinged portion 35a of bracing assembly 35 to rod 57 under seat 33 to ensure that bracing assembly 35 folds inwardly upon seat 33 being lifted. It will be noted that end 66a of link 66 is slidably located upon rod 57 to permit a full folding thereof. (Also FIGS. 3 and 4.)

Referring also to FIGS. 5 and 6, back rest assembly 34 is adapted to fold outwardly upon framework 30 being folded as heretofore described, and also to positively lock upon framework 30 being fully opened out to provide a solid back support. To this end, assembly 34 comprises two separate cushions 67 and 68, each supported upon upper beams 69 and 70 respectively and lower beams 71 and 72 respectively, the outer ends of beams 69 and 71 being pivotally attached to upper vertical portion 43 of side frame 31, and the outer ends of beams 70 and 72 being similarly attached to upper vertical portion 52 of side frame 32.

Referring particularly to FIGS. 5 and 6, the innermost ends of upper beams 69 and 70 are interconnected by a link plate 73.

Plate 73 having two keyhole slots 74—74 formed therethrough, one at each end thereof. Each slot 74 comprises an inner, circular hole 75 and a parallel sided portion 76 extending radially outwardly therefrom. The diameter of hole 75 is greater than the width of portion 76 so that a square pin 77 may slide along portion 76 while being prevented from rotation by the sides thereof, but, upon reaching hole 75, may be freely rotated therein. Each inner end of beams 69 and 70 supports a pin 77 adapted to cooperate in slots 74 of plate 73 and in this manner, beams 69 and 70 may be held in rigid axial alignment upon their respective pins 77 being located in their parallel sided portion 76 of slots 74, but upon moving beams 69 and 70 together to cause their pins 77 to enter their respective holes 75, and thus beams 69 and 70 may be rotated about their respective pins 77 during the chair folding operation and thereby eventually brought into substantially parallel relationship.

Lower beams 71 and 72 may be similarly linked.

Referring particularly to FIGS. 1 and 2, front vertical bars 40 and 49 of framework 30 each support outwardly extending axles 78 for the support of conventional wheels (not shown). Bosses 79 are located around axles 78 and are adapted to maintain the wheels spaced apart from framework 30.

Referring to FIG. 7, framework 30 is illustrated having two front wheels 80—80 fitted thereto, on axles 78—78 as previously described and supported at the rear by two small wheels 81—81.

Figure 8:
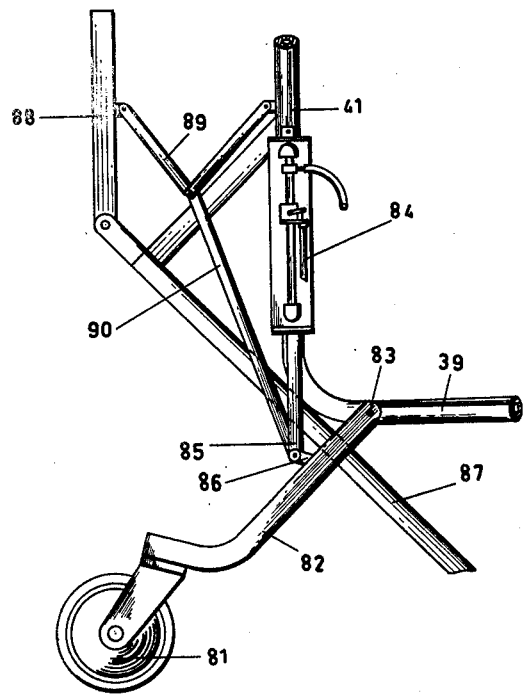
FIG. 8 is a fractional side elevation of a rear, castered wheel assembly, showing particularly hydraulic mechanism utilized in the lowering and raising of the rear wheels.

Referring also to FIG. 8, wheels 81 are castered on legs 82, the upper ends of which are pivotally mounted on two axles 83—83 adapted to extend horizontally inwardly from horizontal bars 39 and 47 at oppositely located lower corners of framework 31. A hydraulic cylinder 84, having its upper end secured to vertical bar 41 is connected at its ram end 85 to a lug 86 integral with leg 82. In this manner, extension of ram end 85 causes wheel 81 to pivot downwardly and similarly, retraction of said ram end 85 causes wheel 81 to pivot upwardly.

A stair angle support beam 87 is rigidly attached to the corner of framework 30 formed at the junction of vertical bar 41 and lower horizontal bar 39 and, in normal operating position, beam 87 is adapted to be at an angle to the ground substantially that of a conventional set of stairs.

Beam 87 extends upwardly and rearwardly of framework 30 to pivotally support a rear extension piece 88; the latter being adapted to act as an axial extension to beam 87 when required in the stair climbing phase and to fold upwardly when not required for use, thus reducing the overall length of framework 30. Extension 88 is required for use only when wheel 81 is retracted, and to this end, a folding bracing strut 89 is actuated by a lever 90, which in turn is operated by ram end 85 of hydraulic jack 84; retraction of ram end 85 causing lever 90 to move upwardly, straightening bracing strut 89, which, being pivoted at vertical bar 41 of framework 30 at the one end and an extension 88 at the opposite end, causes extension 88 to move arcuately downwardly simultaneously with wheel 81 moving arcuately upwardly. Full retraction of wheel 81 coincides with full alignment of extension 88 with beam 87.

Figure 9:
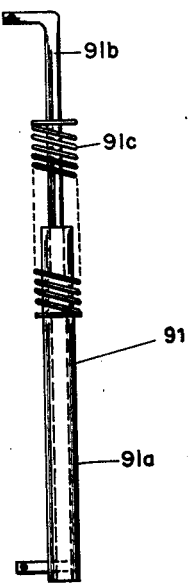
FIG. 9 is a side elevation of a self adjusting connector rod assembly between the front safety extension and the selector lever illustrated in FIG. 8.

Referring also to FIG. 9, lever 90 may be replaced by a telescopic rod 91 comprising members 91a and 91b suitably stopped and loaded with spring 91c to permit a delay action so that wheel 81 may be partially retracted before extension 88 moves outwardly. This would permit partial retraction of framework 30 prior to the lowering of rear extensions 88 for greater safety in restricted areas such as narrow stair landings and the like.

Referring back to FIG. 7, an electric motor 100 is illustrated mounted axially on a beam 101. One end, 101a of beam 101 is pivotted on a lug 102 located substantially at the juncture of vertical bar 41 and lower horizontal bar 39 of framework 30. The opposite end 101b is moved arcuately by means of a selector lever 103 and a connecting rod 104. In order to facilitate gear changing and to provide a fully positive locking action a cam 105 is provided, movement of lever 103 being transmitted through rod 104 and a short operating arm 106, rotating cam 105, which, being axially mounted on a lug 107, extending upwardly from lower horizontal bar 39 of framework 30, is able to rotate within a profiled hole 108 formed in beam 101, thereby raising or lowering said motor 100 as required by raising or lowering lever 103.

Motor 100 is of the gear head type, having a take off gear 109 operating in parallel spaced apart relation with beam 101 and being adapted to drive wheel 80 forwardly or rearwardly, through the medium of a gear and friction type wheel 110, when in the upward position and to operate a stair climbing mechanism assembly 111 when in its lower position.

Selector lever 103 is adapted to move beam 101, and therefore, motor 100 from the upper to lower position as described, a quadrant plate 112 having three indexing slots 113 cooperating with lever 103 to selectively maintain lever 103 in an upper position 113a, the lower position 113b or a center, neutral position 113c.

Connecting rod 104 below its attachment with operating arm 106 is rigidly secured to rod 104a; said rod 104a is adapted to slidably receive a telescoping rod 114. A coil spring 115 surrounds the upper portion of rod 114, said spring having retaining end discs 116 and 116a; end disc 116 being secured to rod 114 and end disc 116a being secured to the lower end of rod 104a.

The lower end of rod 114 is pivoted to the apex 117a of a triangular brace member 117 pivoted at its forward end 117b to the lower portion 42 of front vertical bar 40. The remaining corner 117c of member 117 is pivotally attached to a strut 118, the opposite end of which is similarly attached to a front safety extension 119. Extension 119 is in turn pivotted to the forward, lower end of support beam 87 as shown in FIG. 7.

It will be evident, therefore, that upon lever 103 being moved into its lower position 113b, rod 104 causes rod 114 to move downwardly through the medium of spring 115. In turn, plate 117 pivots arcuately downwardly about its forward end 117b causing corner 117c thereof to force strut 118 down. The downward movement of strut 118 causes front safety extension 119 to pivot arcuately downwardly until its forward end 119a is caused to contact the ground upon the latter action taking place, further movement of selector lever 103 causes rod 104 to compress spring 115. Support beam 87 also pivotally supports an elongated rectangular walking beam 120 carrying on its lower surface a plurality of triangular stair grippers 121. The angle of beam 87 is duplicated by walking beam 120 so that the latter is maintained in parallel relationship with any standard stairway.

The method of pivotally attaching beam 120 to beam 87 is by means of a plurality of lifting arms 122, each attached at one end to beam 87 and the other end to beam 120 so that reciprocal motion transferred to beam 120 through mechanism 111 causes walking beam 120 to move in an ellipsoidal path while remaining at the same angle to the ground which is also the angle of slope of a stair.

It will also be noted from FIG. 7 and from FIG. 22, that a plurality of spaced apart, triangular stair grippers 123 are also located on the underside of beam 87.

Referring to FIGS. 10 and 11, stair climbing mechanism 111 and wheel drive 110 are shown in greater detail. Upon wishing to drive the chair forward or backward, connecting rod 104 is raised, bringing take off gear 109 up to contact and drive the combined gear and frictional wheel 110. Lowering of beams 120 causes it to pass through the central area first, which coincides with neutral position 113c of selector lever 103, gear 109 being completely disengaged at this point. Movement of lever 103 and rod 104 to the "stair climbing" position 113b as shown in FIG. 7 causes gear 109 to engage with a large gear 126, the latter being the main driving gear for mechanism 111 and sufficiently large to act as a flywheel. A small gear 127 is located on the same rotary shaft 128 as main gear 126, so that both gears 126 and 127 revolve at the same speed. Gear 127 is adapted to drive two gear trains, one forward train 129 and the other a downward train 130.

Forward gear train 129 comprises a double idler unit 131, the larger gear 131a of which being driven by gear 127 and the integral small gear 131b being adapted to drive a large gear 132 having an integral camplate 133.

Downward gear train 130 comprises a double idler unit 134, the larger gear 134a being driven by gear 127 and the small gear 134b being adapted to drive a second, larger idler gear 135 which in turn transfers the drive to a slightly larger gear 136.

Gear 136 is keyed to a shaft 137 and small final drive gear 138 is also keyed to shaft 137, spaced apart and outwardly of gear 136. One end of the foremost lifting arm 122 is freely located on shaft 137 between gears 136 and 138.

Final drive gear 138 is adapted to mesh with an internal gear rack 139 of substantially elliptical configuration, the upper and lower sides 139a and 139b respectively, being straight and parallel and joined by semi-circular end pieces 139c and 139d. Gear rack 139 is carried by walking beam 120. It should be noted that in order that gear 138 may freely operate within rack 139, the radius of end pieces 139c and 139d must be large enough to permit gear 138 to move therearound without fouling adjacent gear teeth. A cam device 140 to be described in detail later, ensures gear 138 remaining correctly meshed and in driving contact with gear rack 139. This is especially important as gear 138 is required to cooperate with lower sides 139b of rack 139.

Thus, rotation of gear 138 causes rack 139 to reciprocate and, therefore, walking beam 120 must also reciprocate.

At the same time, lifting arm 122 being centrally pivotted on the same shaft as second idler gear 135 and also freely pivoted on shaft 137 at its end adjacent drive gear 138 is moved under the influence of a lever 141 adapted to connect the upper end of lever 122 with one end of a bell crank lever 142. A pivot pin 143 attaches lever 142 to framework 30 so that, under the influence of cam 133, lever 142 is caused to pivot about pin 143, moving the upper end of lever 122 through the medium of lever 141.

Cam 133 is so designed that bell crank lever 142 is operated only intermittently, the dwell 133a of cam 133 permitting lever 142 to remain static while gear 132 rotates through a major arc. Double idler gear 131 reduces the relative speed of gear 132 so that gear 132 moves through 1 revolution during the time that small gear 138 completes one full traverse of internal gear rack 139. The traversing of rack 139 by gear 138 causes the former to reciprocate, the direction of movement being determined by the direction of rotation of gear 138 and its engagement with either side 139a or 139b of rack 139.

The combination of reciprocating movement of rack 139 as explained and a raising and lowering of gear 138 due to the pivotting action of lever 122 initiated by cam 133, causes rack 139 to move in an ellipsoidal path.

Referring to FIGS. 12 to 17 inclusive, the construction and operation of walking beam 120 is illustrated.

Referring specifically to FIG. 12, beam 120 is of elongated rectangular tubular configuration, stair grippers 121 being located on the lower, narrow edge 120a thereof. An elongated slot 150 is formed through inner vertical wall 120b of beam 120, and extends centrally of and substantially parallel with lower edge 120a and upper edge 120c of beam 120.

Referring specifically to FIGS. 13, 14 and 15, cam device 140 also comprises a rectangular tubular housing 151 slidably fitting within beam 120. A wedge shaped split cam assembly 152 is located within housing 151 and comprises an outer cam 152a attached to outer side wall 151a of housing 151 while a similar inner cam 152b is attached to inner side wall 151b of housing 151. Cams 152a and 152b are separated by a comparatively wide gap 153.

Housing 151 is pivotally attached to rear lifting arm 122 as shown in FIG. 7, two bossed holes 154 and 155 being adapted to accommodate a bolt, rivet or the like and to fully support housing 151 to prevent it twisting longitudinally during operation.

Referring to FIGS. 16 and 17, gear rack 139 is retained in a substantially rectangular housing plate 156, the corners thereof being clipped to provide oppositely located narrow ends 157 and 158. End 157 carries a pin 159 therethrough, its ends protruding on each side of plate 156 to provide spindle supports for a pair of oppositely located rollers 160 and 161. At the opposite end 158, a pin 162 extends therethrough, and upon assembly of rack 139 within beam 120, pin 162 is adapted to extend through the sides of beam 120 to pivotally locate housing 156 within beam 120. It should be noted that housing 156 is much narrower than beam 120 and is, therefore, able to move arcuately about pin 162 as illustrated in FIG. 12.

Thus, in operation, cam housing 151 is assembled within beam 120 and then pivotally attached to arm 122 as described. Boss 154 is adapted to be a sliding fit in slot 150 formed in wall 120b of beam 120, so that beam 120 may move longitudinally independently of cam device 140. Upon assembly of gear rack 139 within beam 120, rollers 160 and 161 are adapted to contact cams 152a and 152b respectively, pin 162 permitting them to follow the contours of said cams and thereby pivot assembly 139 about pin 162.

Thus, upon gear 138 rotating in engagement with gear rack 139, the latter, through pin 162, will cause beam 120 to reciprocate. In order to overcome gravity and retain gear 138 in full engagement with the lower portion 139b of rack 139, the action of rollers 160 and 161 upon cams 152a and 152b respectively is timed to ensure that said rollers are following the undersurfaces of said cams upon gear 138 being in engagement with lower portion 139b, and are engaging the upper surfaces of said cams upon gear 138 driving upper gear portion 139a.

As previously explained in FIG. 10, this reciprocating action, taken in conjunction with the orbital path of arms 122, causes beam 120 to move in an elliptical path.

Referring to FIGS. 8, 18, 19 and 20, a safety device is illustrated whereby rear wheels 81 are caused to fold automatically upon chair 30 commencing to descend any step prior to manual selection of mechanism 111, the object being to rapidly move the centre of gravity toward the rear of the chair and thus prevent the chair and its occupant from toppling forward. To this end, each hydraulic cylinder 84 as shown in FIG. 8 is equipped with a by-pass pipe 165 to permit the fluid within the cylinder maintaining a hydraulic lock in the extended position, to flow to the retraction side of the cylinder. This action is controlled by a by-pass valve 166 as shown in FIG. 18, each valve 166 being operated by a cable 167. FIG. 20 illustrates two cables 167 attached to the free end of a pivot arm 168, the latter being caused to move arcuately by a pair of cables 169. As shown in FIG. 19, each cable 169 is attached at its forward end to a spring loaded sleeve 170, the latter being attached to the outer conduit 169a of cable 169. Cable 169 extends forwardly of sleeve 170 to become attached to the free end of a lever 171 which in turn is pivotally mounted on support beam 87. An operating arm 172 extends upwardly at right angles to beam 87 and is attached to a sector plate 173 adapted to extend below beam 87. The position of plate 173 is such that it is normally off the ground but, upon chair 30 commencing to drop over the edge of a step or stair, the lower surface 173a thereof will contact the upper edge of the step and plate 173 will be forced to move arcuately upwardly. A cam profile 174 extending between arm 172 and plate 173 is in contact with the free end of lever 171, so that upward travel of plate 173 is translated into a pulling action on cable 169. It will be noted that a pull on either cable 169 will activate pivot arm 168 and, therefore, cables 167 so that even with only one wheel of chair 30 moving over a step, the automatic collapsing action as described will be effected.

Referring back to FIG. 19, spring loaded sleeve 170 also supports a locking stop 175 adapted to cooperate with a hinged lever 176 which, in the normal position, holds stop 175 to the rear but, upon the "stair climbing" position being selected by selector lever 103 as illustrated in FIG. 7, a remote control cable 177 extending between selector lever 103 and hinged lever 176 is adapted to raise lever 176. A pin 178 extends from lever 176 through a slot 179 formed in operating arm 172 so that an upward pull on cable 177 is transferred through pin 178 to arm 172, causing it to move upwardly and actuate cable 169a as previously described. In this manner, rear wheels 81 are caused to collapse upon selection of the stair climbing action by lever 103.

It will be seen from FIG. 19 that, upon lever 176 being raised, stop 175, under its spring loading, is caused to move thereunder and thus prevent any inadvertent operation which would raise the rear wheels 81 during the climbing or descending phase.

The mating edges of stop 175 and lever 176 are substantially mutually inclined, providing a wedge action, so that, upon a downward force being applied to lever 176 by cable 177 through selector lever 103 being moved downwardly, the wedge action is sufficient to overcome the spring loading of sleeve 170 and stop 175, forcing stop 175 rearwardly and lever 176 down, which, is again transferred through pin 178 to arm 172, causing the latter to move downwardly thereby relieving pressure from lever 171 and cable 169 and, as described, permitting hydraulic pressure to be applied to hydraulic cylinder 84, thereby raising rear wheels 81.

Referring to FIGS. 7 and 21, a chair 200 embodying the invention as set forth is illustrated in preparation for climbing a set of stairs 201, its selector lever 103 being located in the lowermost slot 113b of quadrant plate 112, as previously described, this action causes telescopic rod 114 to move front safety extensions 119 downwardly to contact the ground and to be retained in that location by coil spring 115. At the same time, rear wheels 81 are folded back as described in FIGS. 18, 19 and 20 and rear safety extensions 88 are lowered as detailed in FIG. 8. It will be noted that chair 200 is in close proximity to stairs 201 and walking beam 120 is adapted to contact lower stair treads 202 during its reciprocation.

FIG. 22 shows chair 200 during its climbing action on stairs 201, stair grippers 123 attached to support beams 87 resting on treads 202, while walking beam 120 continues to reciprocate in its elliptical path, as also described in FIGS. 10 and 11. It will be noted that stair grippers 121 on beam 120 are well clear of treads 202 of stairs 201 and that front safety extensions 119 have been moved to their fully extended positions through the action of spring 115 on telescopic rod 114.

Further travel of walking beam 120 will cause its stair grippers 121 to descend and contact stair treads 202.

Figure 23:
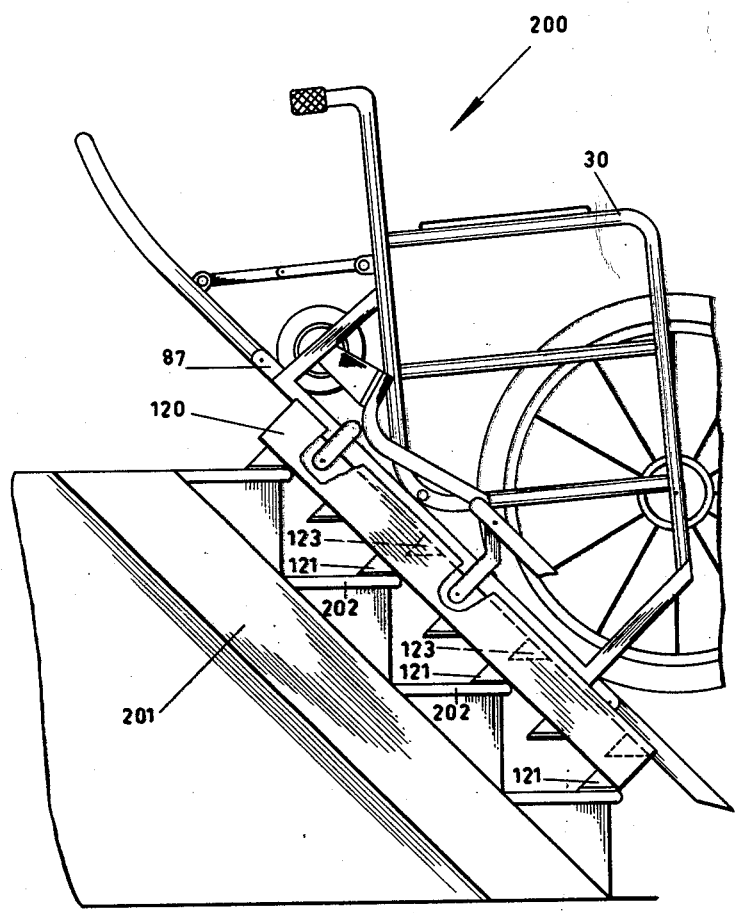
FIG. 23 is a fractional side elevation of the chair shown in FIGS. 21 and 22 upon approaching the upper end of the stairway.

FIG. 23 illustrates the action of chair 200 after grippers 121 of beam 120 have contacted treads 202, the relative movement between beam 120 and frame 30 continuing, but, due to the interference of stairs 201, beam 120 is caused to remain static so that frame 30 is lifted clear of stairs 201 in a reciprocating path similar to that of beam 120. Upon grippers 123 of frame 30 contacting treads 202 at the conclusion of one lifting cycle, stair climbing mechanism 111 is at a point where the substantially vertical component of the cycle is about to commence so that grippers 121 on beam 120 may be lifted upwardly off treads 202 to permit beam 120 to again reciprocate until grippers 121 contact the next set of treads 202.

From the foregoing description it will seen that chair 200 moves progressively up stairs 201, a predetermined number of steps at a time. Due to the angle at which beam 87 is disposed relative to frame 30, and the fact that it remains parallel with stair 201, frame 30 remains upright during the climbing action. It is also within the scope of the invention to vary the angle between beam 87 and frame 30 so that chair 200 may be permitted to lean backwards during the climbing operation if it is deemed necessary.

Figure 24:
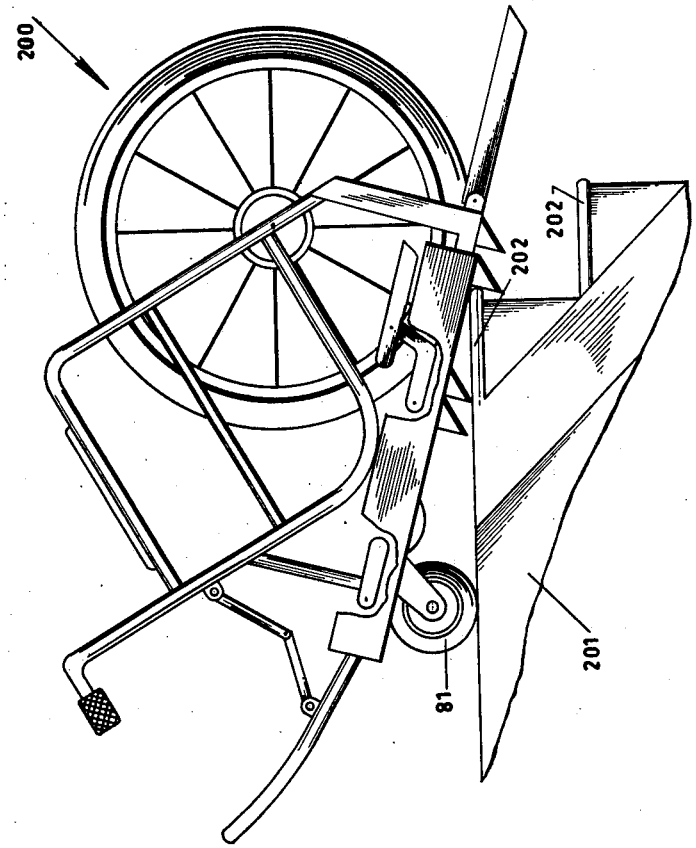
FIG. 24 is a side elevation of the chair located at the top of a stairway after completion of an ascent thereof or in preparation of descent.

FIG. 24 illustrates the final step upon chair 200 reaching the top of stairway 201. As previously explained, the lift imparted by walking beam 120 in climbing is firstly vertical and then rearward so that, upon reaching the uppermost step 202 and thereafter moving upwardly over the point of balance, chair 200 is caused to tilt back and rear wheels 81 to contact the landing above stairway 201. Further operation of beam 120 moves chair 200 rearwardly away from the threshold of stairway 201. Selector lever 103 may thereafter be moved to centre slot 113c of quadrant plate 112, which disengages take-off gear 109 and actuates remote control 177, as illustrated in FIGS. 7 and 19 respectively. Control 177 moves lever 176 downwardly, overriding locking stop 175, forcing it to move rearwardly and, through cables 169, levers 168 and cables 167 as described in FIGS. 8, 18, 19 and 20, bypass valves 166 on their respective hydraulic cylinders 84 are actuated and pressure in cylinders 84 is again applied to force ram ends 85 down and, through lugs 86, cause legs 82 to move arcuately downwardly. In this case, however, legs 82 and their respective wheels 81 are firmly located on the landing, the action therefore resolving itself in the raising of the rear end of chair 200 to assume its normal position. At the same time, front and rear safety extensions 119 and 88 respectively are retracted.

In order to descend stairway 201, it is necessary to reverse the action described, selector lever 103 being again moved to the lowest slot 113b in quadrant 112, resulting in the folding of rear wheels 81 and the extending of safety extensions 88 and 119. Motor 100 is reversible, a suitably located switch being provided, and walking beam 120 is thereby caused to reverse its direction of travel so that chair 200 is caused to move progressively down stairway 201.

It should be noted that hydraulic jacks 84 are operated by either a hand or electrically driven pump of conventional design and batteries for the operation of motor 100 are installed under upper horizontal bars 37 and 46 of frame 30, the area under arm rests 38 and 48 being suitably enclosed to form battery housings.

The general design of the individual parts of the invention as explained above may be varied according to the requirements in regards to manufacture and production thereof, while still remaining within the spirt and principle of the invention, without prejudicing the novelty thereof.

The embodiments of this invention in which an exclusive property or privilege is claimed are defined as follows:

1. A stair climbing wheelchair including a framework comprising a plurality of side frames, a seat member extending between said side frames; a back rest also extending between said side frames in a plane substantially perpendicular to said seat member; rear spindles and front axles extending from said side frames; leg members and rear wheels rotatably supported thereby; said leg members being pivotally mounted on said rear spindles; front wheels rotatably mounted on said front axles; a plurality of support beams extending angularly to said side frames; a plurality of walking beams and lifting arms pivotally interconnecting said walking beams with said support beams; said lifting arms converting reciprocation of said walking beam into elliptical travel thereof; means for effecting the reciprocation of said walking beams; first stair gripper means extending from the lower surfaces of said support beams; second stair gripper means extending from the lower surfaces of said walking beams; means for the selective retraction of said rear leg members and rear wheels; rear safety extensions to said support beams; means for extending said rear extensions upon retraction of said rear legs and wheels; front safety extensions to said support beams and means for selectively extending said front extensions.

2. A stair climping wheelchair as defined in claim 1 in which said framework is foldable, said seat being hingedly attached to a first of said side frames; at least one hinge strip hingedly supported at one end by a second of said side frames and supported at the opposite end by hinge means located substantially centrally of the undersurface of said seat; cross bracing means extending between said side frames; hinge means dividing said cross bracing and a link rod connecting said hinge means with said seat; raising of said seat causing partial folding of said cross brace through said link rod; and said back rest being divided longitudinally into two parts, one of said parts being hingedly mounted on said first side frame, the other on said second side frame; and at least one link plate hingedly joining said two parts at their line of division.

3. A stair climbing wheelchair as defined in claim 2 in which pairs of oppositely located, vertical pins are supported rearwardly of and spaced apart from said two parts of said back rest adjacent said line of division, said pins being of rectangular section; and one of said link plates connecting each of said pairs of pins; each of said link plates having two oppositely handed keyhole slots formed therethrough, the parallel sided portions of said slots being slidable over said pins and the circular portions of said slots permitting rotation of said pins therein.

4. A stair climbing wheelchair as defined in claim 1 in which said means for the retraction of said rear legs and said means for extending said rear extensions include at least one hydraulic jack having one end anchored to said framework and the opposite end attached to at least one of said rear legs; a hinged bracing strut extending between said framework and each of said rear extensions; lever means interconnecting said hinged struts and said rear legs; and pump means for the operation of said hydraulic jack.

5. A stair climbing wheelchair as defined in claim 1, each of said walking beams being of oblong box beam construction slidable over a rectangular cam housing having a split wedge shaped cam therein; an inner wall of said walking beam being slotted longitudinally; support shafts extending from said framework through said slot to maintain said cam housing in a fixed location; an elongated rectangular gear housing having an elongated elliptical aperture formed therethrough; an internal gear rack lining said aperture; said gear housing having one end pivotally mounted on said walking beam and its opposite end supporting a cam follower device; said device cooperating with said cam; rotary gear means cooperable with said gear rack; rotation of said rotary gear causing reciprocation of said gear rack and housing, and similar reciprocation of said walking beam through said pivotal mounting of said gear housing thereon.

6. A stair climbing wheelchair as defined in claim 1 including electric motor means; a take-off gear driven by said motor; a beam supporting said motor; said beam being pivotally mounted on said framework; selector means to move said beam into a first, second or third position; a friction wheel engageable with said take off gear in said first position; said friction wheel driving said front wheels; a large gear engageable with said take-off gear in said third position; said large gear driving said walking beams through gear trains; and said take-off gear being completely disengaged in said second position.

7. A stair climbing wheelchair as defined in claim 6 in which said large gear; a double idler gear driven by small gear and driving a second idler gear; said second idler gear being journalled on one of said lifting arms and driving a rotary gear; an internally toothed, elliptical gear rack pivotally mounted on said walking beam, said rotary gear being cooperable with said gear rack in effecting reciprocation of said beam; and means operable by said small gear to effect a vertical lifting and lowering of said walking beam.

8. A stair climbing wheelchair as defined in claim 7 in which said means to effect a vertical lifting and lowering of said walking beam includes a second double idler gear driven by said small gear; a cam gear driven by said second double idler gear; a cam plate integral with one surface of said cam gear; and bell crank means, operable by said cam plate, pivotally connected to lever means; and said lever means pivotally connected to one of said lifting arms; rotation of said cam gear causing oscillation of said bell crank by said cam plate; and said oscillation causing partial rotation of said lifting arms through said lever means thereby raising and lowering said walking beams.

9. A stair climbing wheelchair as defined in claim 1 in which said front safety extensions are pivotally connected to said support beams at their rear ends, strut means pivotally attached to said extensions substantially centrally thereof; triangular actuating plate means pivotally attached to said framework at their first corners and to the opposite ends of said struts at their second corners; resiliently telescopic rods pivotally attached to said triangular plates at their third corners; and means for the depression of said rods to cause arcuate movement of said triangular plates and downwardly arcuate movement of said extensions through said struts.

10. A stair climbing wheelchair as defined in claim 4 including safety means at the front of said wheelchair for the automatic folding of said rear wheels and operation of said rear extensions upon the front wheels of said wheelchair dropping beyond a safe limit; said safety means comprising two sector plates pivotally attached to opposite sides of the front of said framework and extending below it; the lower edges of said sector plates being in substantially parallel adjacency to the ground; an operating arm integral with and projecting upwardly from said sector plates; hinged levers operable by said operating arms; locking stops resiliently and releasably loaded onto said hinged levers; arcuate upward movement of said sector plates moving said levers by said operating arms and releasing said locking stops; by pass valve and pipe means in said hydraulic jacks; cable means interconnecting said locking stops with said bypass valves; and a common pivot arm operable by cables from either of said locking stops to operate all said bypass valves simultaneously.

11. A stair climbing wheelchair as defined in claim 10 including remote control cable means attached to said hinged levers for the manual release of said locking stops and operation of said safety means.

12. A stair climbing wheelchair as defined in claim 10 including electric motor means; a take-off gear driven by said motor; a beam supporting said motor; said beam being pivotally mounted on said framework; selector means to move said beam into a first, second or third position; a friction wheel engageable with said take off gear in said first position; said friction wheel driving said front wheels; a large gear engageable with said take off gear in said third position; said large gear driving said walking beams through gear trains; said take off gear being completely disengaged in said second position, and said remote control cable means being attached at their opposite ends to said selector means and said hinged levers being released by said remote control cables, upon said selector means being selected to said third position.

References Cited in the file of this patent
UNITED STATES PATENTS

| | | |
|---|---|---|
| 1,591,764 | Martinson | July 6, 1926 |
| 1,627,984 | Martinson | May 10, 1927 |
| 1,687,306 | O'Toole | Oct. 9, 1928 |
| 2,192,396 | Burch | Mar. 5, 1940 |
| 2,765,860 | Church | Oct. 9, 1956 |
| 2,798,565 | Rosenthal | July 9, 1957 |
| 3,068,950 | Davidson | Dec. 18, 1962 |